United States Patent
Riesselmann et al.

(10) Patent No.: US 6,322,108 B1
(45) Date of Patent: Nov. 27, 2001

(54) PIPE FITTING

(75) Inventors: Franz-Josef Riesselmann, Lohne; Peter Braegelmann, Ochtrup, both of (DE)

(73) Assignee: Hewing GmbH, Ochtrup (DE)

( * ) Notice: Subject to any disclaimer, the term of this patent is extended or adjusted under 35 U.S.C. 154(b) by 0 days.

(21) Appl. No.: 09/393,157

(22) Filed: Sep. 10, 1999

(30) Foreign Application Priority Data

Sep. 12, 1998 (DE) .............................. 198 41 801

(51) Int. Cl.$^7$ .............................. F16B 31/02; F16L 35/00
(52) U.S. Cl. .................... 285/3; 285/39; 285/4; 411/2; 411/3
(58) Field of Search ................ 285/3, 4, 39; 411/1–8

(56) References Cited

U.S. PATENT DOCUMENTS

| | | | |
|---|---|---|---|
| 1,380,395 | * 6/1921 | Korach | 411/3 |
| 3,425,314 | * 2/1969 | Ohlson | 411/2 |
| 3,504,591 | * 4/1970 | Christopherson | 411/3 |
| 3,667,339 | * 6/1972 | Dame | 411/3 |
| 3,929,054 | * 12/1975 | Gutshall | 285/2 |
| 4,046,052 | 9/1977 | Nordstrom . | |
| 4,159,667 | * 7/1979 | Nordstrom | 411/6 |
| 4,575,274 | * 3/1986 | Hayward | 285/323 |
| 4,687,392 | * 8/1987 | Bidwell | 411/6 |
| 4,789,759 | * 12/1988 | Jones | 285/3 |
| 4,836,727 | * 6/1989 | Volkmann | 411/4 |
| 4,867,624 | * 9/1989 | Walley | 411/3 |
| 5,658,017 | * 8/1997 | Chirehdasy | 285/4 |
| 5,927,917 | * 7/1999 | Gibbons | 411/4 |

FOREIGN PATENT DOCUMENTS

| | | |
|---|---|---|
| A2 739714 | 3/1978 | (DE) . |
| U9 310556 | 11/1993 | (DE) . |
| 9 603587 | 2/1996 | (WO) . |

* cited by examiner

*Primary Examiner*—Eric K. Nicholson
(74) *Attorney, Agent, or Firm*—Birch, Stewart, Kolasch & Birch, LLP

(57) ABSTRACT

A pipe fitting comprises a fitting body with a longitudinal axis, having a pipe connection member for the sealed connection of a pipe and a thread for threadedly joining the fitting body to a connection unit, and a member on the fitting body to be driven by a tool, to which a tool for turning the fitting body about its longitudinal axis may be applied for threadedly joining the same to the connection unit. This fitting is provided with means between the tool engaging portion and the fitting body that limit the torque acting on the fitting body when the tool engaging portion is turned.

2 Claims, 3 Drawing Sheets

PIPE FITTING

FIELD OF THE INVENTION

The present invention refers to a fitting to which a pipe, in particular a plastic material pipe or a composite plastics-metal pipe, may be connected to establish a pipe connection. In particular, the invention relates to such a fitting made of plastic material.

Recently, increased efforts were made to replace the conventional metal fittings with fittings of plastic material. Plastic material fittings are advantageous with a view to corrosion. However, plastic material is less stable than metal so that there is a risk of destroying the fitting—during mounting—to an extent where it becomes useless. This risk is particularly prevailing with threaded fittings screwed to another unit of the pipeline system.

From WO-A-96/03587, DE-U-93 10 556, DE-A-27 39 714 and U.S. Pat. No. 4,046,052, its is generally known to have threaded joint members provided between the portion to be engaged by a tool and the threaded joint body with means limiting the torque acting on the threaded joint body when turning the portion engaged by the tool.

It is an object of the present invention to provide a fitting, wherein the risk of the fitting being destroyed beyond usefulness when being screwed onto another unit of the pipeline system is reduced.

SUMMARY OF THE INVENTION

According to the invention, the object is solved with a fitting comprising
- a fitting body with a longitudinal axis, having a pipe connection member for the sealed connection of a pipe and a thread for threadedly joining the fitting body to a connection unit, and
- a portion on the fitting body to be engaged by a tool, to which a tool for turning the fitting body about its longitudinal axis may be applied for threadedly joining the same to the connection unit.

With this fitting, it is provided by the present invention that means are provided between the tool engaging portion and the fitting body that limit the torque acting on the fitting body when the tool engaging portion is turned.

With the present fitting, the portion of the fitting to which a tool (a wrench, a pair of tongs, or the like) is applied for turning and thereby screwing on the fitting, and the fitting body are connected by torque limiting means. Generally speaking, these are means that have a lesser shear resistance than the fitting body. Thus, when the fitting body is screwed on, the connection between the tool engaging portion and the fitting body is broken upon exceeding a torque defined by the shear resistance of the torque limiting means and exerted by the tool engaging portion.

Thus, in the present fitting body, the force engagement of the joint between the tool engaging portion and the fitting body is selected and set correspondingly. The force engagement is either obtained by frictional engagement, form fitting, material or component engagement or a combination of these.(In the context of this invention, "material or component engagement" is meant to include an engagement by bonding two materials or components, as by welding or by an intermediate layer, such as an adhesive.) Thus, e.g., by correspondingly selecting the fit between the fitting body and the tool engaging portion, a desired frictional engagement can be obtained. By selecting the bonding technique (welding, adhering), a desired material or component engagement can be obtained. Cooperating projections and recesses (the physical surface structure of the opposite faces of the tool engaging portion and the fitting body) can provide a desired form fitting.

If the fitting body and the tool engaging portion are integrally connected, it is feasible to provide for a weakening of the material in the region of the joint of the two elements of the fitting by forming passages, recesses or indentations, the weakening acting in the manner of a rated breaking point and extending concentrically around the longitudinal axis of the fitting.

Alternatively, a connecting element may be arranged between the fitting body and the tool engaging portion, having a lower shear resistance than the fitting body. Sin the context of the present invention, such connecting elements cover separate elements, but also a layer of adhesive. Advantageously, the connecting element is made from plastic material.

When metal is used as the material of the connecting element, the interface connection of the connecting element with either the tool engaging portion or the fitting body, or both, is to be designed less shear resistant than the fitting body by selecting the force engagement accordingly.

DESCRIPTION OF THE DRAWINGS

The following is a detailed description of embodiments of the present invention with reference to the accompanying drawings. In the Figures.

DESCRIPTION OF THE PREFERRED EMBODIMENTS

Figure 1:
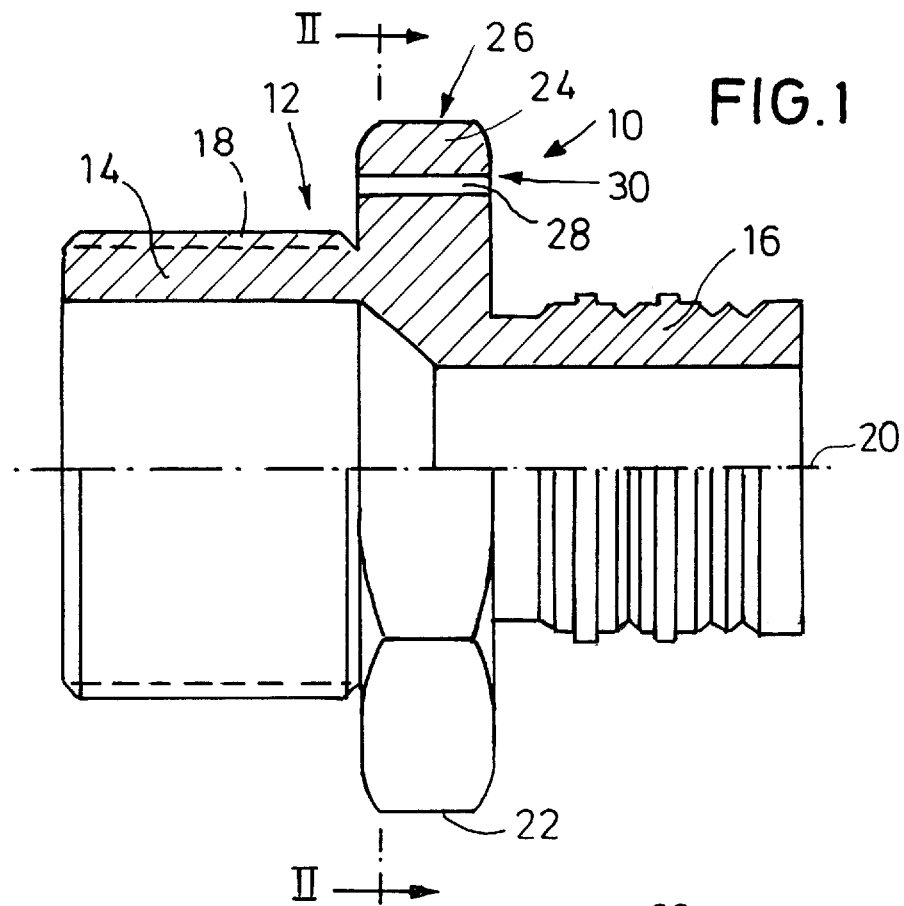
FIG. 1 is a half-section through a fitting according to a first embodiment of the invention.
Figure 2:
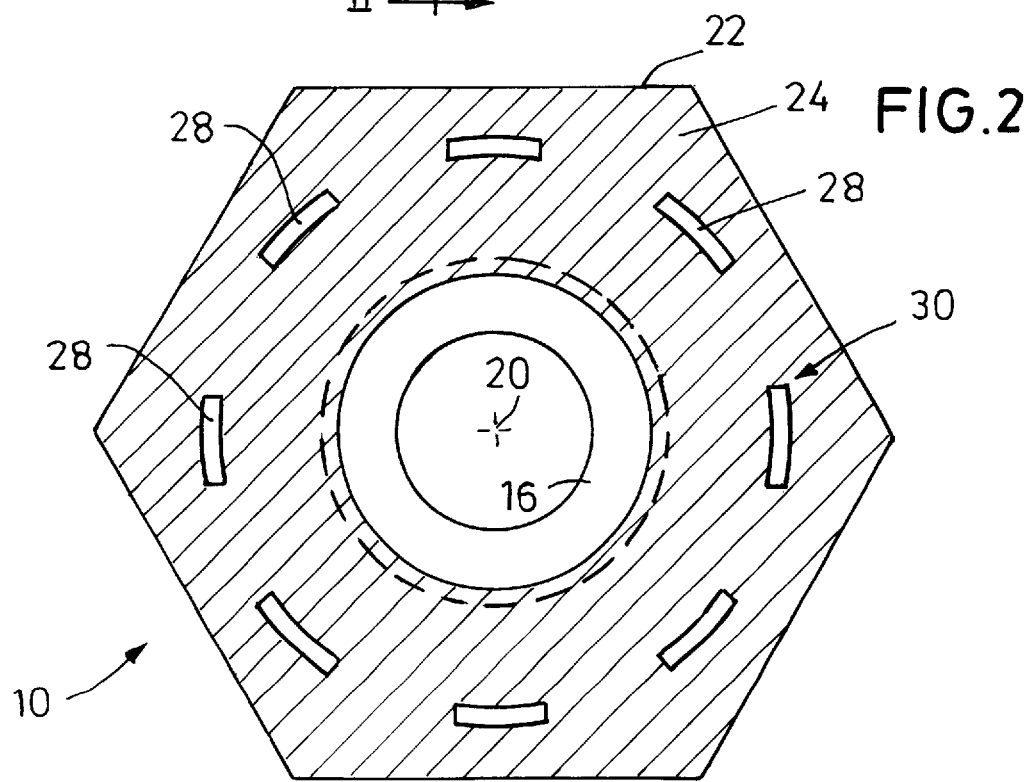
FIG. 2 is a sectional view along the line II—II of FIG. 1.

FIGS. 1 and 2 show illustrations of a fitting 10 with a torque limiting feature. The fitting 10 comprises a fitting body 12 with a threaded portion 14 and a pipe connection portion 16. The threaded portion 14 has an outer thread 18, whereas the pipe connection portion 16 is formed as a connection piece projecting from the threaded portion 14.

To screw the fitting 10 to a connecting unit or another unit of the pipeline system, the fitting body 12 is turned about its longitudinal axis 20. To this avail, a tool is used, e.g. a wrench, set onto a outer hexagonal structure 22 of a collar 24 that usually projects radially. This collar 24 with its outer hexagonal structure forms the tool engaging portion 26 of the fitting 10.

As illustrated in FIGS. 1 and 2, the collar 24 and the fitting body 12 are formed integrally. In the transitional region from the fitting body 12 to the collar 24, a plurality of passages 28 that extend in parallel to the longitudinal axis 20, are formed in the fitting 10, the passages being formed, in particular, in the manner of ring segments. Thus, a weakening of the connection between the collar 24 and the fitting body 12 is obtained. This zone of rated breaking points extends concentrically to the longitudinal axis 20 of the fitting body 12. Thereby, a (concentrically) arranged torque limiting means 30 is formed; a torque applied to the collar 24 by the tool and acting on the fitting body 12 via the collar is transmitted by the rated breaking point zone only to a maximum value defined by the rated breaking zone. Since the connection (tool engaging portion 30) of the collar 24 with the fitting body is less shear resistant than the fitting body, the same may be protected against damage upon screwing.

Figure 3:
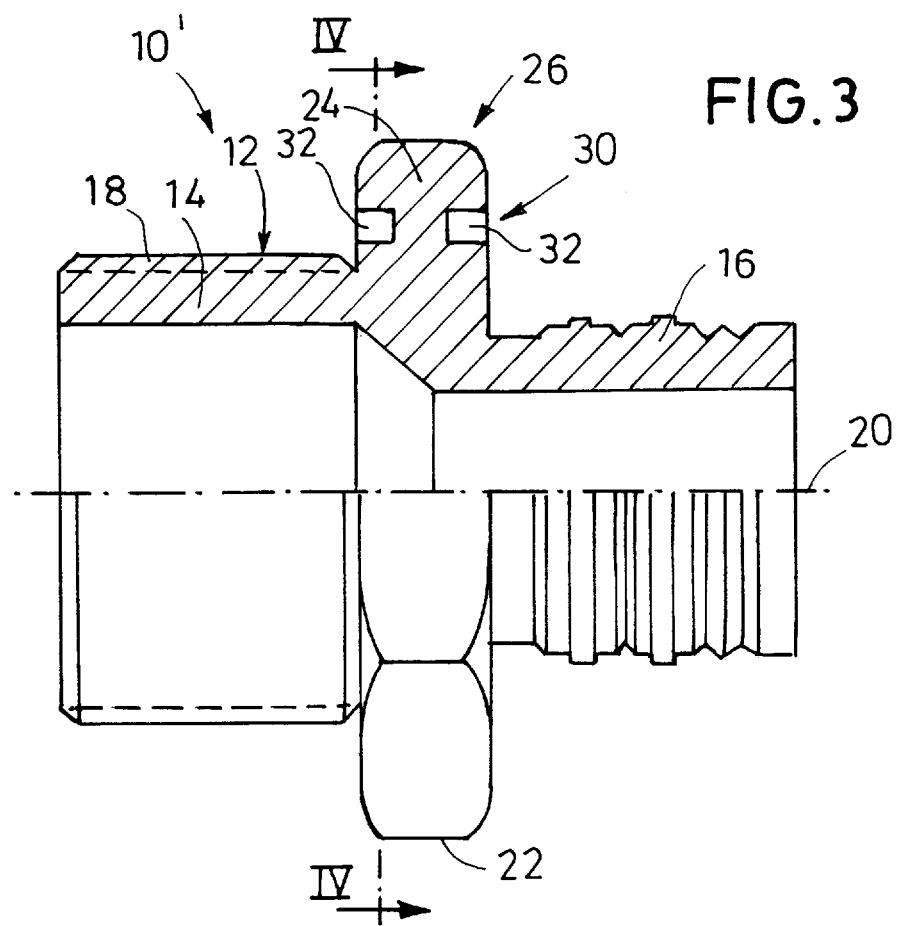
FIG. 3 is a half-section through a fitting according to a second embodiment of the invention.
Figure 4:
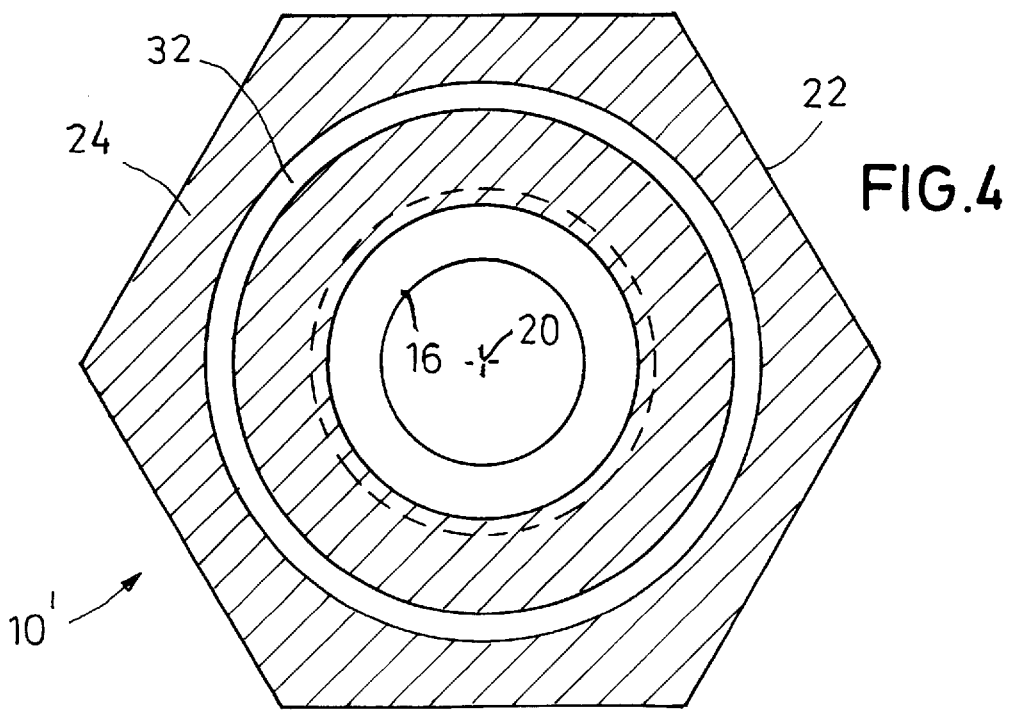
FIG. 4 is a sectional view along the line IV—IV of FIG. 3.

The difference between the embodiment of FIGS. 3 and 4 over the fitting 10 of FIGS. 1 and 2 is that the weakening of the material in the connection region of the collar 24 and the fitting body 12 is obtained by two annular grooves 32 facing away from each other and being open in opposite directions of the longitudinal axis of the fitting 10'. For the rest, similar or analogue parts have been given the same reference numerals in FIGS. 3 and 4 and FIGS. 1 and 2.

Figure 5:
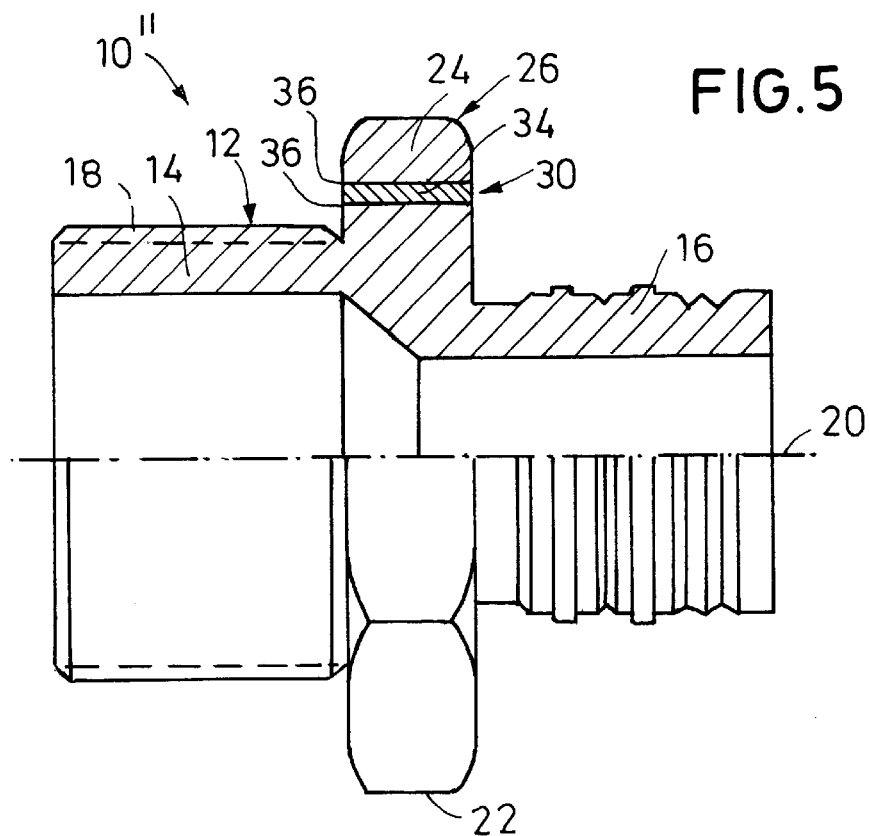
FIG. 5 is a half-section through a fitting according to a another embodiment of the invention.
Figure 6:
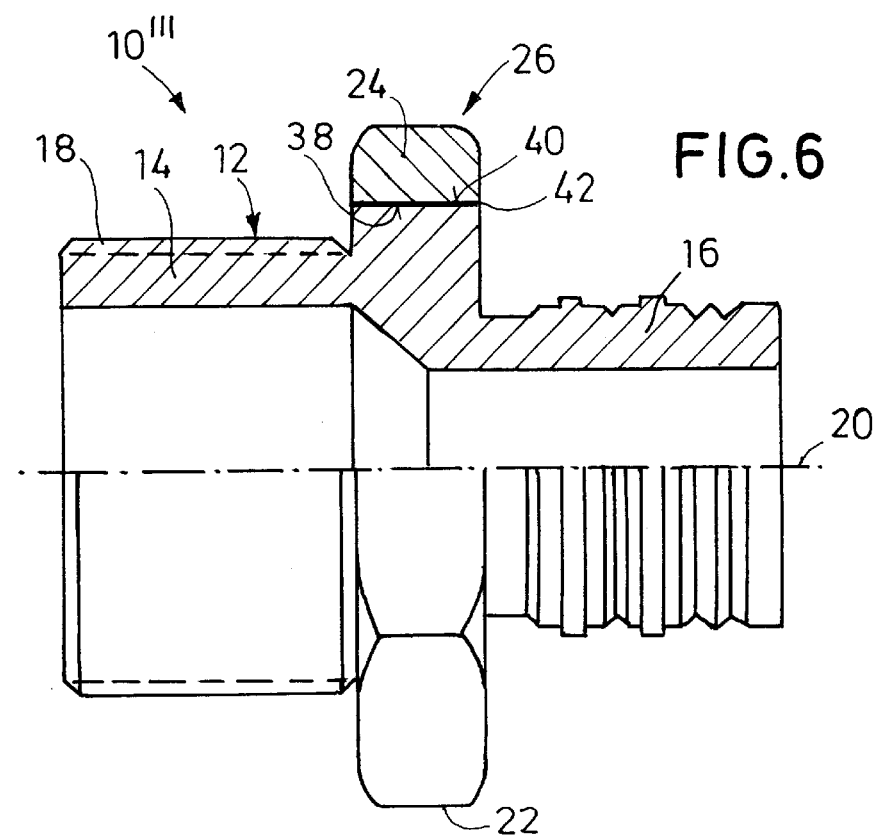
FIG. 6 is a half-section through a fitting according to a last embodiment of the invention.

FIGS. 5 and 6 illustrate two further embodiments of fittings 10" and 10'" provided with torque limiting means 30. Again, the parts similar or functionally equivalent to the parts of the fittings 10 and 10' have been given the same reference numerals.

According to FIG. 5, the fitting 10'" has a connecting element 34 formed as a ring concentric to the longitudinal axis 20. The ring consists of a (plastic) material having a lower shear resistance than the fitting body 12. Alternatively, the interface connections 36 of the connecting element 34 with the collar 24 and with the fitting body 12 are less shear resistant than the fitting body 12.

As illustrated in FIG. 6, the inner surfaces 38 of the collar 24 and the outer surfaces 40 of the fitting body 12 abut, the interface connection 42 being set correspondingly (by frictional engagement, form fitting, component or material engagement) so that the same is less shear resistant than the fitting body 12.

By arranging and forming an annular zone concentric to the longitudinal axis of the fitting with a lower shear resistance than the fitting body it is guaranteed that, when screwing the fitting on, no damage of the fitting can occur that would impair the sealing function of the fitting. Thus, the fitting can be made from plastic material instead of metal, which is also advantageous under aspects of corrosion.

What is claimed is:

1. A pipe fitting comprising
   a fitting body with a longitudinal axis, having a pipe connection member for the sealed connection of a pipe and a thread for threadedly joining the fitting body to a connection unit, and
   a portion on the fitting body to be engaged by a tool, to which a tool for turning the fitting body about its longitudinal axis may be applied for threadedly joining the same to the connection unit, characterized in that
   means are provided between the tool engaging portion and the fitting body that limit the torque acting on the fitting body when the tool engaging portion is turned
   wherein the torque limiting means is an annular rated breaking zone that extends concentrically to the longitudinal axis of the fitting body and comprises a plurality of passages or recesses extending in parallel to the longitudinal axis, or at least a recess extending concentrically at least in portions and being open in the direction of the longitudinal axis, and two groups of such recesses with their open sides facing away from each other.

2. The fitting of claim 1, wherein the passages are in the shape of ring segments.

* * * * *